(12) United States Patent
Liou

(10) Patent No.: US 10,792,622 B2
(45) Date of Patent: Oct. 6, 2020

(54) GAS DISSOLVING SYSTEM WITH TWO MIXERS

(71) Applicant: Huei Tarng Liou, Taipei (TW)

(72) Inventor: Huei Tarng Liou, Taipei (TW)

( * ) Notice: Subject to any disclaimer, the term of this patent is extended or adjusted under 35 U.S.C. 154(b) by 189 days.

(21) Appl. No.: 16/171,491

(22) Filed: Oct. 26, 2018

(65) Prior Publication Data

US 2020/0129946 A1  Apr. 30, 2020

(51) Int. Cl.
*B01F 3/04* (2006.01)
*C02F 1/78* (2006.01)
*B01J 8/22* (2006.01)
*C02F 1/20* (2006.01)
*B01J 8/18* (2006.01)
*C02F 1/72* (2006.01)

(52) U.S. Cl.
CPC ......... *B01F 3/04099* (2013.01); *B01J 8/1818* (2013.01); *B01J 8/22* (2013.01); *C02F 1/20* (2013.01); *C02F 1/78* (2013.01); *B01F 2003/04879* (2013.01); *B01F 2003/04886* (2013.01); *C02F 1/727* (2013.01)

(58) Field of Classification Search
CPC ........ B01J 8/1818; B01J 8/22; B01F 3/04503; B01F 3/04985; B01F 3/2223; B01F 5/0423; B01F 5/0428; B01F 2003/04879; B01F 2003/04886; B01F 3/04099; C02F 1/20; C02F 1/727; C02F 1/78
See application file for complete search history.

(56) References Cited

U.S. PATENT DOCUMENTS

2006/0107969 A1* 5/2006 Fittkau ................. G05D 11/139
  134/1.3
2010/0147690 A1* 6/2010 Audunson ........... B01F 3/04985
  204/557

FOREIGN PATENT DOCUMENTS

KR   WO2018084545 A1 *  5/2018

OTHER PUBLICATIONS

WO2018084545A1_ENG (Espacenet machine translation of Cho) (Year: 2018).*

* cited by examiner

Primary Examiner — In Suk C Bullock
Assistant Examiner — Gabriel E Gitman
(74) Attorney, Agent, or Firm — Ballard Spahr LLP

(57) ABSTRACT

A gas dissolving system using double mixers to generate a higher gas concentration in liquid is disclosed. The gas dissolving system includes two gas mixers, a degassing device, pressure valves, a pressure sensor, and a pump. Liquid flows through mixers to entrain gas therein, and it thus contains dissolved gas and undissolved gas. The liquid subsequently flows into the degassing device so that undissolved gas is released to the outside environment, and dissolved gas remains in the liquid. The liquid with dissolved gas combines with raw liquid and is diluted so that it becomes liquid with a desired gas concentration as the output. A high gas concentration of liquid is obtained after more cycles of fluid flow through the mixers to dissolve gas without combining raw liquid.

5 Claims, 1 Drawing Sheet

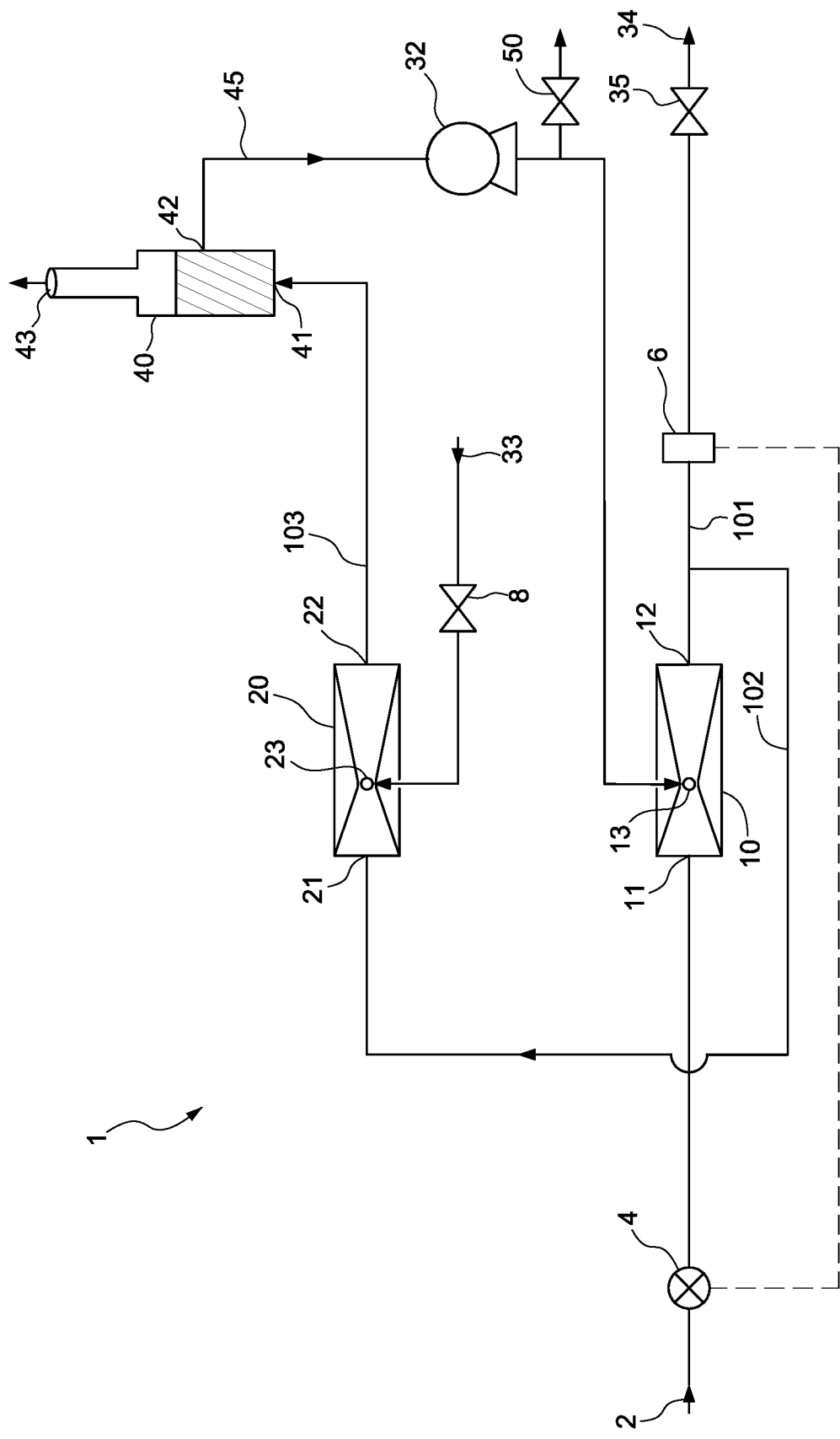

GAS DISSOLVING SYSTEM WITH TWO MIXERS

FIELD OF THE INVENTION

The present invention relates to a gas dissolving system using two mixers to achieve a high gas dissolving rate for liquid.

BACKGROUND

Gases may dissolve in water, but the solubility of gas varies significantly among different gases. Under atmospheric pressure and room temperature (25 degrees Celsius), gases, such as $NH_3$, $CO_2$, $O_3$, and $O_2$, have a solubility of 700 L, 1 L, 0.4 L, and 0.03 L per liter of water, respectively. In industrial applications, a Venturi tube is usually adopted as a gas and liquid mixer, through which gas is drawn to mix with liquid. With this method, gas drawn into liquid is only partly dissolved in the liquid. A substantial part of the gas is still undissolved in the liquid. Gas concentration in the liquid processed through a Venturi tube is substantially lower than that of a saturated liquid, and may not meet the requirements in some applications.

Therefore, there is a need for a system for producing liquid with high gas concentration.

Among the gases mentioned above, ozone ($O_3$) has been increasingly important in numerous industrial applications, such as waste water and drinking water disinfection, since ozone kills many bacteria, protozoa, and viruses that cause disease in humans.

One of the primary advantages for ozone is that it provides a safe, effective, and environmentally friendly alternative to toxic and corrosive chemical processes.

The ozone concentrations required for water disinfection are much lower than those required for wafer cleaning. Research has demonstrated that ozone can offer a more environmentally friendly alternative to existing cleaning processes and, in many instances, can outperform them.

The ozone molecule is very unstable and has a short half-life. Therefore, it will decay after some time into its original form of oxygen ($O_2$) according to the reaction presented below:

Because of its short half-life, ozone will start to decay soon after it has been produced. The half-life of ozone in water is about 30 minutes, which means that every half hour the ozone concentration will be reduced to half its initial concentration.

Since liquid containing high ozone concentration is not easy to obtain, there is also a need for a system that can produce liquid with a high ozone concentration.

SUMMARY

The system according to the present invention utilizes two negative pressure suction mixers, and is equipped with a degassing device and pressure valves to achieve a high gas dissolving rate in the liquid. One of the two mixers is used to draw in gas to mix with the liquid; the other mixer is used to mix raw liquid with the gas-contained liquid. By controlling the pressure valves, the system may provide two dosed liquid outputs. One is the output for a high concentration dosed liquid, and the other is the output of dosed liquid capable of being diluted to a desired concentration.

By adding a gas destructor to the degassing device, the system according to the present invention can process gases which are harmful and cannot be released to the outside environment. The gas-containing liquid is directed to the degassing device provided with the gas-destructor. The gas-destructor contains the destruction medium. The undissolved gas in the liquid will react with the destruction medium to become harmless gases which can safely be released to the outside environment.

BRIEF DESCRIPTION OF THE DRAWINGS

The figure shows the layout of the gas dissolving system with two mixers according to the present invention.

DETAILED DESCRIPTION

An exemplary embodiment of the present invention will be explained hereinafter in detail with reference to the accompanying drawing.

The present invention relates to a gas dissolving system using two mixers. Its allocation plan is shown in FIG. 1. The system mainly comprises two mixers 10, 20; a degassing device 40; a pressure sensor 6; pressure valves 4, 8, 35, 50; and a pump 32.

As shown in FIG. 1, a first mixer 10 has a liquid inlet 11, a liquid outlet 12, and a throat inlet 13, wherein the liquid inlet 11 of the first mixer 10 is connected to a raw liquid source 2 through a pressure valve 4, and the liquid outlet 12 of the first mixer 10 is connected to a dosed liquid output 34 through a pipe line 101. The pipe line 101 is installed with a pressure sensor 6 electrically coupled (represented in broken line in FIG. 1) to the pressure valve 4.

The system 1 comprises a second mixer 20, which has a liquid inlet 21, a liquid outlet 22, and a throat inlet 23. The liquid inlet 21 of the second mixer 20 is connected to the pipe line 101 at a point between the liquid outlet 12 of the first mixer 10 and the pressure sensor 6, and the throat inlet 23 is connected to a gas source 33 through a back pressure valve 8.

The system 1 comprises a degassing device 40, which has an input 41, an output 42, and a gas vent 43. The input 41 of the degassing device 40 is connected to the liquid outlet 22 of the second mixer 20 through a pipe line 103, and the output 42 is connected to the throat inlet 13 of the first mixer 10 through a connecting pipe line 45 installed with a pump 32.

The system 1 further comprises a valve 50, which is connected to the pipe line 45 at the point between the pump 32 and the throat inlet 13 of the first mixer 10. The mixers 10, 20 can be Venturi tubes. A Venturi tube has a narrow throat in the middle. As fluid (primary flow) passes through the tube, it speeds up as it flows through the throat, and the pressure drops. The pressure drop in a Venturi tube can be used to draw a second fluid, which is gas in the present invention, into the primary flow, which is liquid in the present invention. The gas drawn into the liquid is only partly dissolved in the liquid. A substantial part of the gas drawn into the liquid is still undissolved in the liquid.

The degassing device 40 includes a gas-liquid separator. When liquid flows through it, the undissolved gas is separated from the liquid and released into the environment. The degassing device 40 further includes a gas destructor if the gas to be processed in the system is ozone.

Ozone is harmful to the environment. When ozone is present in the environment, it is a pollutant in itself, and can damage forests, crops, and human health. The gas destructor contains an ozone destruction medium so that ozone is decomposed into oxygen, thereby avoiding the environmental pollution which would be caused by the direct release of ozone.

As shown in FIG. 1, liquid from the raw liquid source 2 is introduced into the gas dissolving system 1 through a pressure valve 4. The pressure valve 4 is open when receiving a signal from a pressure sensor 6 indicating a pressure lower than a predetermined level, which will be detailed in the following description.

After the raw liquid is introduced into the system 1, it flows through the first mixer 10, and then a portion of it flows along the pipe line 102 rather than the pipe line 101 because a valve 35 near the end of the pipe line 101 is closed. Liquid flowing along the pipe line 102 will then flow through the second mixer 20. Due to a drop in pressure or negative pressure (i.e., pressure lower than atmospheric pressure) caused by the Venturi effect, gas from a gas source 33 is introduced into the second mixer 20 via the throat inlet 23, and mixes with the liquid flowing through the mixer 20.

The liquid flowing out of the second mixer 20 will contain dissolved gas and undissolved gas, which is then introduced into a degassing device 40 through a pipe line 103. The degassing device 40 includes a gas-liquid separator, which may separate the undissolved gas from the liquid. The undissolved gas is released to the outside environment. If the gas is ozone, the undissolved ozone needs to be treated before it is released to the outside environment because it is harmful to the environment. Before ozone is released to the outside environment, it is reacted with the ozone destruction medium in the degassing device 40 so that it is decomposed into oxygen and then released to the outside environment.

The output 42 of the degassing device 40 is connected to the throat inlet 13 of the first mixer 10 through a connecting pipe line 45 installed with a pump 32. The liquid flowing out of the degassing device 40 contains dissolved gas and is pumped by a pump 32 and drawn into the first mixer 10. The liquid drawn into the first mixer 10 mixes with the raw liquid from the raw liquid source 2 and is diluted to a desired concentration as a dosed liquid output 34.

When the valve 35 is closed, the pipe lines 101, 102, 103, and 45 will form a closed loop. Since there is no dosage output, the pressure in the pipe line 101 indicated by the pressure sensor 6 remains constant. Due to the action of the pump 32, liquid in this closed loop continues to flow and the gas from the gas source 33 is continuously drawn into the second mixer 20. The gas concentration in the liquid is getting higher after each cycle until a level close to the saturated concentration is reached. A valve 50 is connected to the connecting pipe line 45 at the point between the pump 32 and the throat inlet 13 of the first mixer 10. Liquid with a high concentration gas is obtained when the valve 50 is opened, and the valve 50 serves as a high concentration dosed liquid output.

The pressure sensor 6 is electrically coupled to the pressure valve 4. The extent to which the pressure valve 4 opens is controlled by the liquid pressure drop in the pipe line 101 sensed by the pressure sensor 6. The pressure sensor 6 is configured to send signals to the pressure valve 4 depending on the magnitude of the pressure drop. When the valve 50 is opened, the pressure in the pipe line 101 drops. The pressure drop is sensed by the pressure sensor 6, which sends a signal to the pressure valve 4 to cause it to open. When the valve 50 is closed, the pressure in the pipe line 101 will rise to its normal level and the pressure valve 4 is signaled by the pressure sensor 6 to close.

It should be appreciated for those skilled in this art that the above embodiment is intended to be illustrative, and not restrictive. It would be appreciated by those skilled in the art that various changes or modifications may be made in this embodiment without departing from the principles and spirit of the disclosure, the scope of which is defined in the claims and their equivalents.

What is claimed is:

1. A gas dissolving system with double mixers, comprising:
    a first mixer (10) having a liquid inlet (11), a liquid outlet (12), and a throat inlet (13), wherein the liquid inlet (11) of the first mixer (10) is connected to a raw liquid source (2) through a pressure valve (4), and the liquid outlet (12) of the first mixer (10) is connected to a dosaged liquid output (34) through a pipe line (101) installed with a pressure sensor (6) electrically coupled to the pressure valve (4);
    a second mixer (20) having a liquid inlet (21), a liquid outlet (22), and a throat inlet (23), wherein the liquid inlet (21) of the second mixer (20) is connected to the pipe line (101) at a point between the liquid outlet (12) of the first mixer (10) and the pressure sensor (6), and the throat inlet (23) is connected to a gas source (33) through a valve (8);
    a degassing device (40) having an input (41), an output (42), and a gas vent (43), wherein the input (41) of the degassing device (4) is connected to the liquid outlet (22) of the second mixer (20) through a pipe line (103), and the output (42) is connected to the throat inlet (13) of the first mixer (10) through a connecting pipe line (45) installed with a pump (32); and
    a valve (50) connected to the connecting pipe line (45) at a point between the pump (32) and the throat inlet (13) of the first mixer (10).

2. The gas dissolving system according to claim 1, wherein the extent that a pressure valve (4) opens is controlled by the liquid pressure drop in the pipe line (101) sensed by the pressure sensor (6), which sends a signal depending on the magnitude of the pressure drop to the pressure valve (4).

3. The gas dissolving system according to claim 1, wherein each of the first mixer and the second mixer is a Venturi tube.

4. The gas dissolving system according to claim 2, wherein each of the first mixer and the second mixer is a Venturi tube.

5. The gas dissolving system according to claim 4, wherein the degassing device (40) comprises a gas-liquid separator and a gas destructor, and the gas source (33) is an ozone source.

* * * * *